Feb. 12, 1935.  B. W. FREEMAN  1,990,597
ORNAMENTING MACHINE
Filed July 26, 1932   5 Sheets-Sheet 1
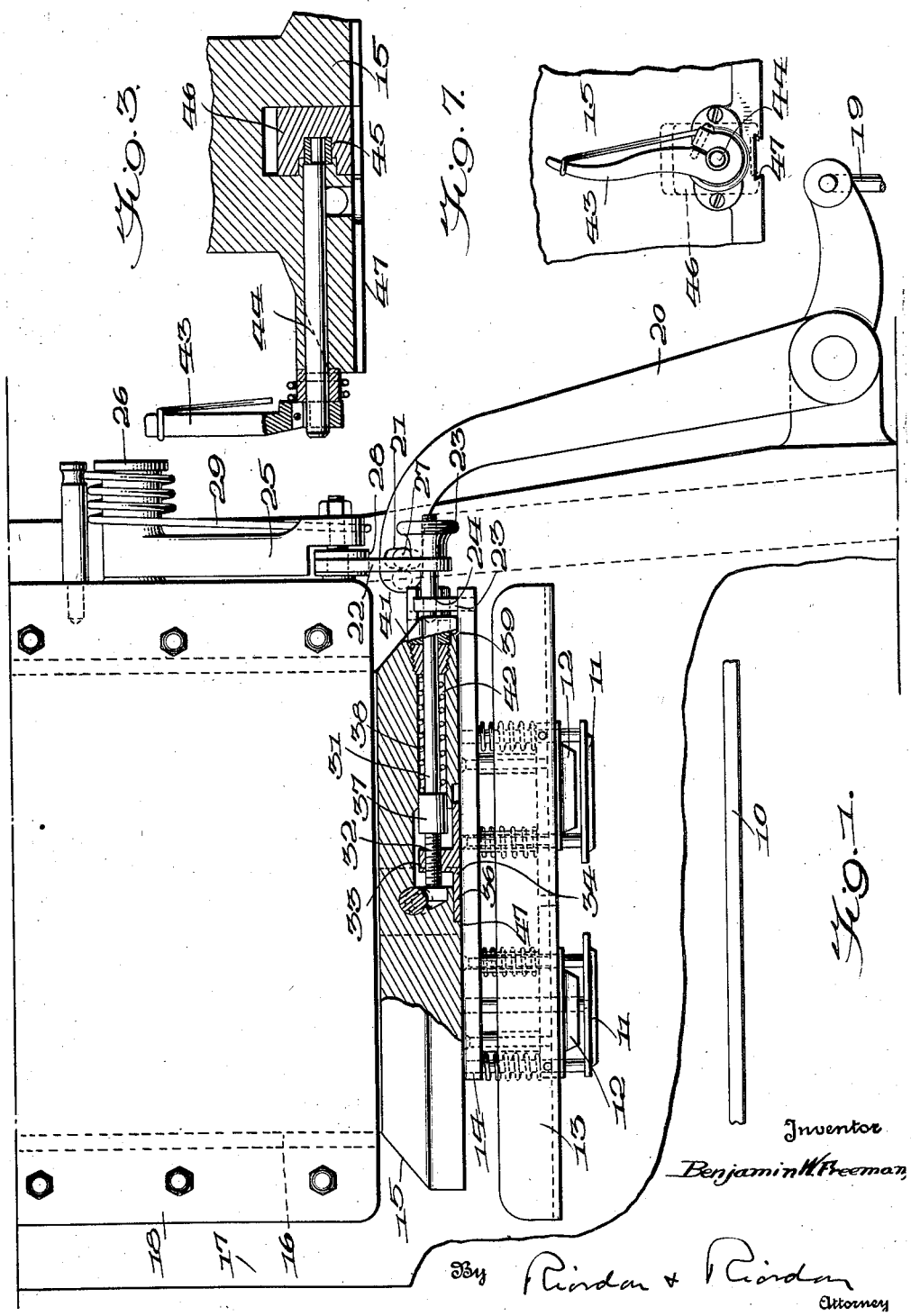
Inventor
Benjamin W. Freeman
By Riordan & Riordan
Attorney

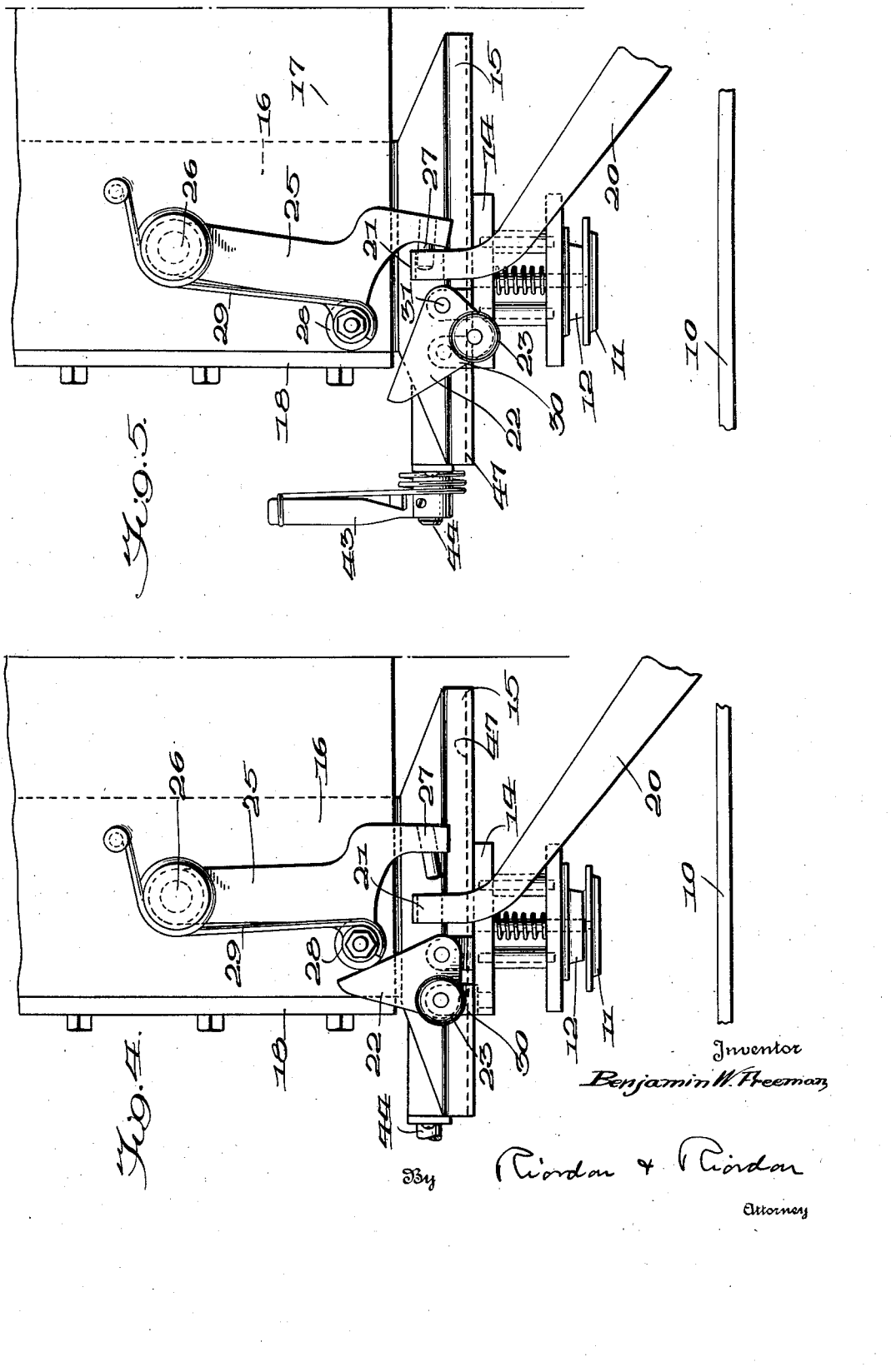

Feb. 12, 1935. B. W. FREEMAN 1,990,597
ORNAMENTING MACHINE
Filed July 26, 1932   5 Sheets-Sheet 3
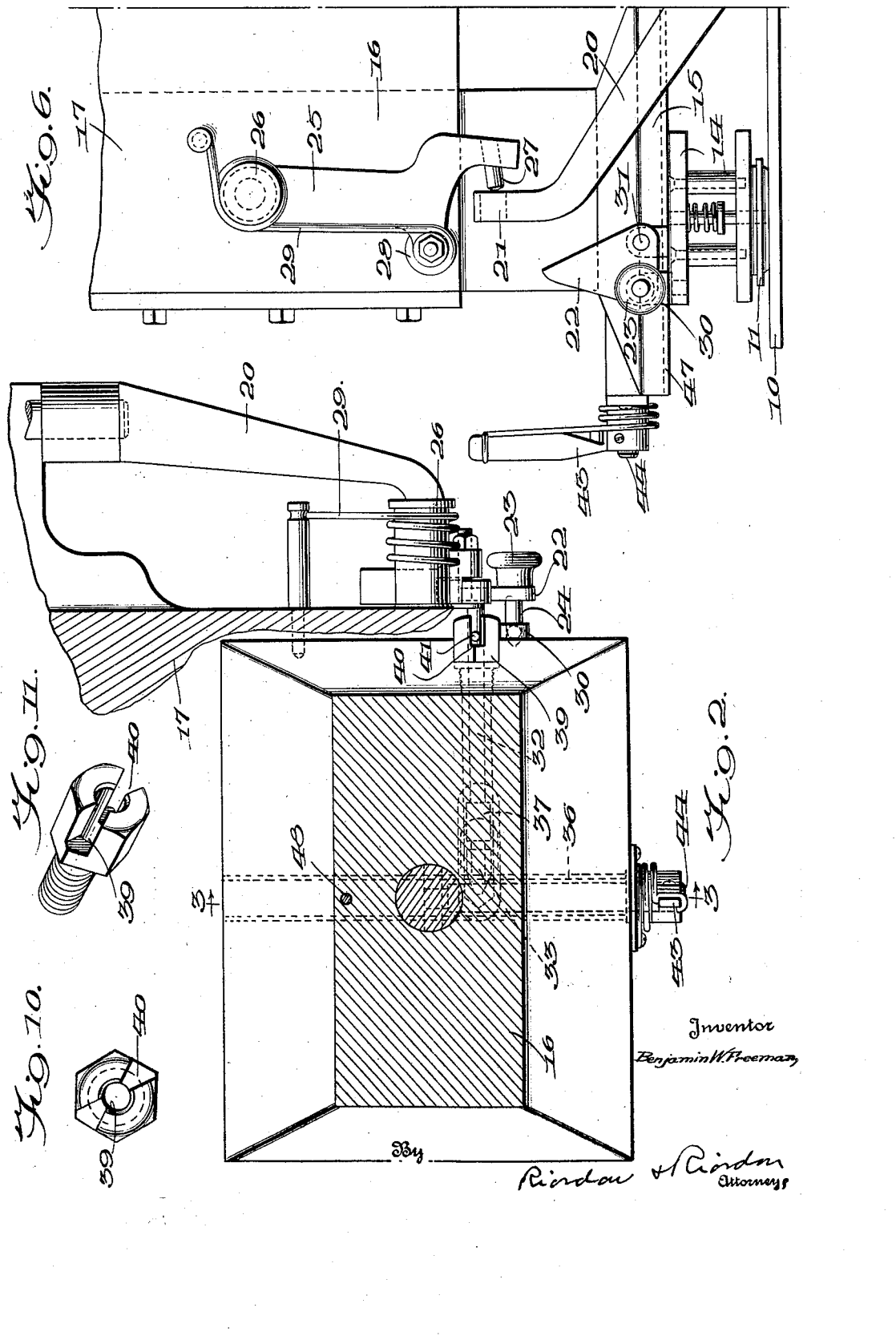

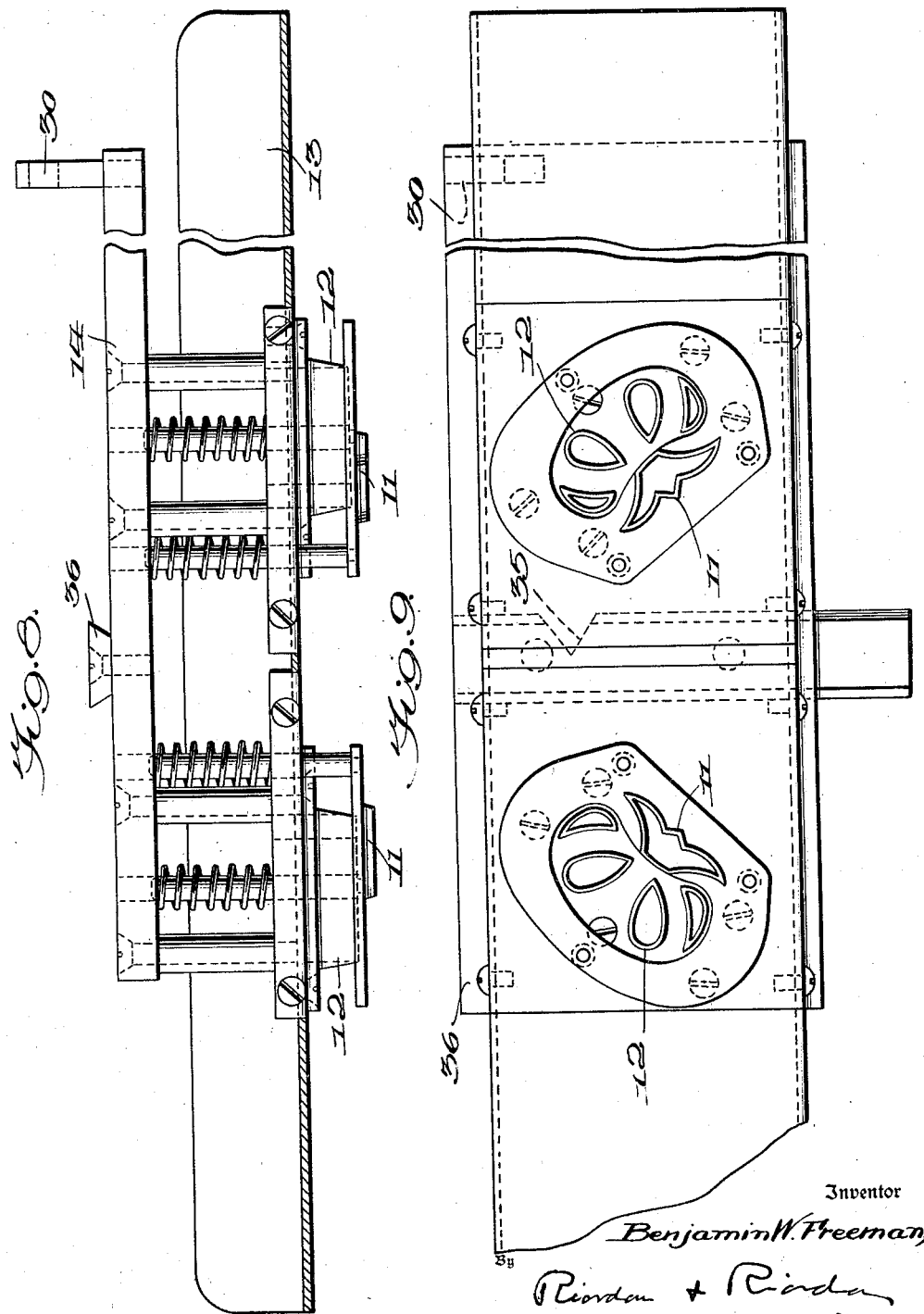

Feb. 12, 1935.  B. W. FREEMAN  1,990,597
ORNAMENTING MACHINE
Filed July 26, 1932   5 Sheets-Sheet 5

INVENTOR
Benjamin W. Freeman,
BY
Riordan & Riordan
ATTORNEY

Patented Feb. 12, 1935

1,990,597

UNITED STATES PATENT OFFICE 1,990,597

ORNAMENTING MACHINE

Benjamin W. Freeman, Cincinnati, Ohio

Application July 26, 1932, Serial No. 624,835

34 Claims. (Cl. 101—295)

This invention relates to shoe ornamenting machinery and more particularly to improvements in combined marking and cutting machines of the type described in my co-pending application Serial No. 563,429, filed September 17th, 1931. Such machines are adapted for operation upon skins, upper blanks, fitted and closed uppers or the like, in which the work is ornamented by marking with an ink or pigment at the same time or as a part of a continuous cycle of operations during which the work is further ornamented by perforating or cutting out a design therein.

Machines of this nature usually include an anvil or a table upon which the work is placed, and marking and cutting dies which are detachably supported in the machine, together with mechanism providing a relative movement between the table and dies. Among the objects of the present invention is the provision of means for not only accurately locating and securing a die in the machine or on a movable plunger therein, but also to render it impossible for an operator to disengage, remove or insert a die without locking the machine, thus avoiding danger of injury to the operator and damage to the machine while handling a die.

While this invention is applicable to various types of ornamenting machines, a preferred embodiment of the invention contemplates the combination thereof with a machine of the type described in the aforesaid copending application.

These machines are usually placed into operation by means of a treadle which controls a clutch mechanism designed to apply power to the working parts of the machine, and another object of the present invention provides an arrangement of parts making it impossible for the machine to be treadled and placed into operation until the die is absolutely and properly positioned in the machine and until the operator has securely locked the die in place.

The machine comprises generally a base having an upstanding frame secured thereto to support an overhanging head, beneath which is arranged a work table which partakes of movements through a horizontal plane from an operative position beneath the head to an inoperative position where the work may be placed on the table, there being a plunger reciprocable in the head toward and from the table and to which the die is attached.

When the machine is treadled the work support moves inwardly and when in the proper position the die descends marking and cutting the work, and then raises to its inoperative position, the table moving outwardly from beneath the die. This sequence of movements is generally accomplished automatically by a single treadling of the machine.

Safety means are customarily provided which prevent actuation of the plunger of the machine when the table is in its inoperative or work positioning location.

In order that the die may be properly located, pins are usually provided which fit into the plunger and as a consequence the die must be moved up and down at least the length of the pin.

The placing and removing of dies on the plunger takes place when the table or work support is in its forward position. If in removing a die the machine should be accidentally treadled or otherwise operated this premature operation would cause a lot of trouble possibly injurying the operator, and breaking the die and other parts. Should the machine start to operate the table would first move inwardly beneath the die and if the die was being held by the hands of the operator and just being raised into the plunger, the work support and inking mechanism would strike the die or the operator's hands. Then the plunger would descend and more damage might occur.

Accordingly, another object of the present invention is to provide means for locking the plunger and table against movement even through the work table is in its outer position effective to normally lock the plunger against movement as accidental treadling or releasing the clutch would cause movement of the table, and subsequent downward movement of the plunger.

However, when the table and inking mechanism are in their respective positions, that is, when the plunger is locked against operation and a die can be changed, there may be insufficient clearance for removal of the die, as the table operating mechanism will lie beneath the die and the table itself will project somewhat from the machine toward the operator.

Still another object contemplates an attaching means for the die by means of which the die may be slid into and out of engagement with the plunger, by the use of a dove-tail plate and slot, in lieu of the conventional locating pins, whereupon the die cannot strike any parts of the machine, and the hands are not placed under the die to raise it and therefore may be in such a position that even if the machine were to operate they would not be injured.

To the attainment of the above, and other objects which will appear as the description proceeds, reference may be made to the accompanying drawings, in which:—

Fig. 1 is an elevation partly in section along the line 1—1 of Fig. 2, showing the plunger in its position of rest with a die attached;

Fig. 2 is a plan partly in section of the plunger and associated elements;

Fig. 3 is a detail of the die holding mechanism taken along the line 3—3 of Fig. 2;

Fig. 4 is a side elevation with the clutch locking mechanism in position to lock the machine;

Fig. 5 is a similar view showing the clutch locking mechanism moved to die releasing position;

Fig. 6 is a similar view showing the plunger and the die in cutting position;

Fig. 7 is a detail elevation of the die holding mechanism;

Fig. 8 is an elevation of the die unit;

Fig. 9 is a bottom plan of the same unit;

Fig. 10 is a face view of a detail of the locking mechanism;

Fig. 11 is a perspective view of the same element.

Figure 12:
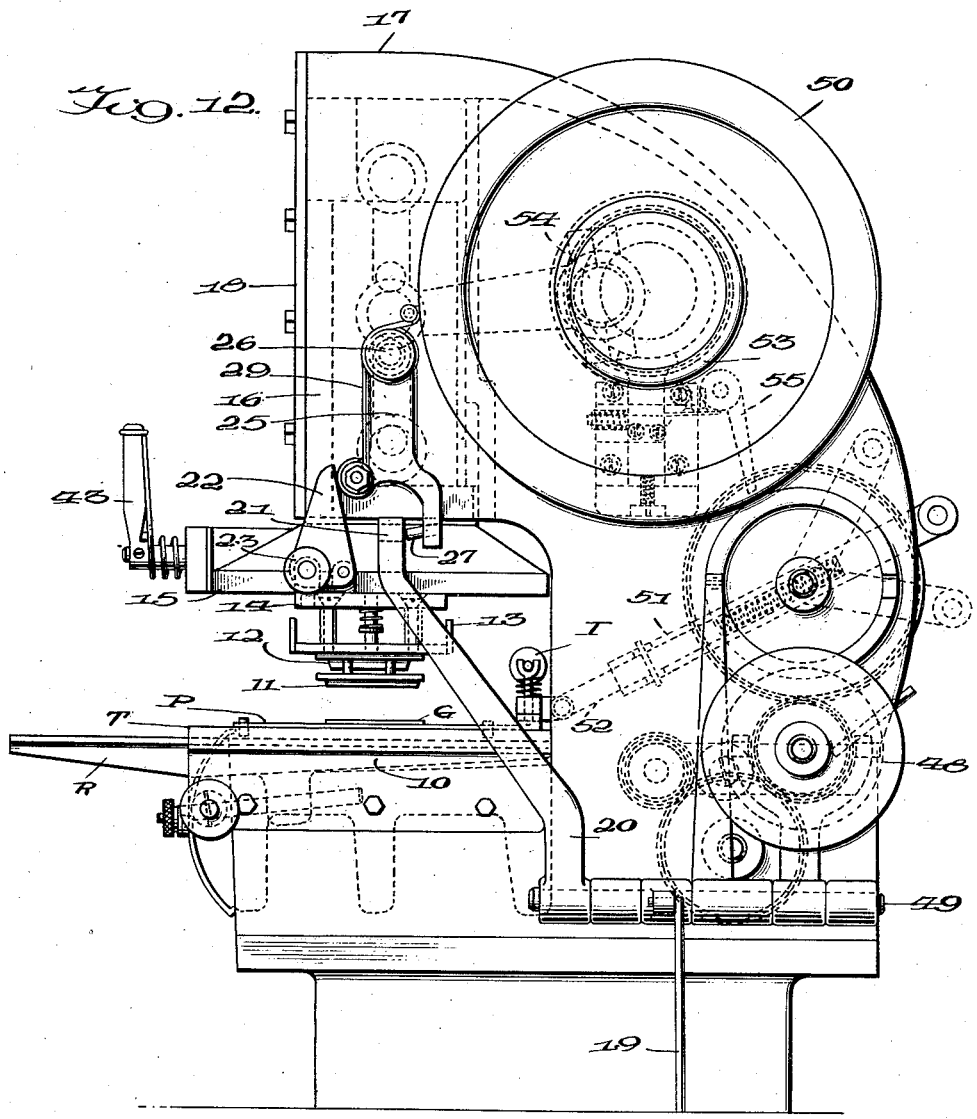
Fig. 12 represents an embodiment of one type of machine, incorporating the invention.

Referring more specifically to the drawings, in which like reference numerals designate like parts, it will be observed that a work and work table support 10 is disclosed, Figs. 1, 4, 5 and 6 showing but the top surface thereof, and Fig. 12 showing the position thereof with respect to the machine, this support carrying a plate of brass or other metal softer than the cutting edges of the die, over its top surface. A backing paper is normally fed over this plate for the purpose of insuring a clean cut through the work. These parts are but diagrammatically illustrated as the present invention is concerned primarily with mechanism for attaching the die and locking the machine against other than normal operation.

A work table T carrying a detachable plate P adapted for directly supporting the work, and mounting suitable abutment gages G is positioned for movement on guide rails R carried by the support 10. An inking mechanism including a resiliently mounted roll I is mounted adjacent the rear or inner edge of the table in a position to contact a die unit spaced above the work support 10, as the table reciprocates outwardly and inwardly.

The die unit comprises generally a marking plate or plates 11 spaced in advance of a cutting die or dies 12, and shaped to provide clearance for passage of the die 12. The cutting dies, as illustrated in Figs. 8 and 9, are of generally hollow or tubular configuration, such that chips cut from the work will be forced upwardly toward the top and out of the cutter. A frame or enclosure 13 about the supporting portion of the die is effective to carry chips from the die to one side of the machine. The advantage of this arrangement lies in the fact that chips are prevented from falling on to the work support or work, where they might act to prevent accurate ornamentation. A die block or base 14 serves to carry the dies proper, the die 12 being rigid therewith, and the die or plate 11 being resiliently mounted thereon. The space between the block 14 and the base of the dies forms, in effect, a chamber into which the chips are deposited as they discharge from the dies, the chips then passing into the enclosure 13. The die block forms a medium for attaching the entire unit to a plunger plate 15, which plate has a shank 16 reciprocable in the head 17 of the machine. Face plates 18 serve to hold the plunger 15—16 in place in the head 17.

A treadle rod 19 is connected to a treadle lever 20, this lever having at its upper end an elongated slot 21.

Attached to the plunger is a lever or cam 22. Attached to the head 17 is a lever 25 pivotally mounted thereon by means of a stud 26. This lever is forked at its lower end and to one of the forks is attached a pin 27, which moves into the slot 21 when a die is inserted or removed. Because the movement of the pin 27 is pivotal about the stud 26 as an axis it is necessary to have the elongated slot 21.

The other fork of the lever 25 carries a roll 28 which normally bears against the locking lever or cam 22 through the action of spring 29. The locking cam 22 includes a knob or handle 23 by means of which the operator may move same. Attached to the cam 22 and opposite the knob is an extending stud portion 24 arranged to fit into a perforated ear 30 which forms a part of the base or die block 14. The cam also carries a stud portion 31 which fits into the plunger plate 15. The end of the stud is threaded as indicated at 32, to engage a member 33 which slides transversely of the plunger, that is, across its face. The member 33 has a V-shaped end 34 which is effective to engage a correspondingly shaped opening 35 in the side of the dovetail 36 attached to the base 14 of the die unit.

The stud 31 has a bearing portion 37 which fits in the opening 38 of the plunger and assists in maintaining alignment when the cam lever 22 is moved in and out. A portion of the stud also fits the bushing 39 which is screwed into the plunger. The head of the bushing 39 has a tapered slot 40 in which a small locking pin 41, attached to the screw stud portion 31 of the cam lever, seats when the cam lever 22 pushes the pin 27 out of the opening or slot 21, unlocking the machine.

The tapered sides of the slot 40 permit a slight transverse movement of the pin 41 about the axis of the bushing 39, under certain conditions, as the cam 22 tends to rotate under influence of the lever 25.

When the cam lever 22 is pulled out (toward the right, in Fig. 1) and given a short turn, then this pin rides on the head of the bushing 39. Normally the cam lever is pressed inwardly through the action of the spring 42 against the shoulder formed by the bearing 37, and in its inward position locks the die at 35 and 30, and at the same time unlocks the machine at 21.

It will be observed that with the foregoing arrangement, should the cam lever 22 be moved a distance sufficient to remove the portion 24 from the ear 30 without removing the pin 41 from the slot 40, that the spring 29, will exert a pressure through the roll 28 against the cam 22, thus causing it, and the pin 41, to revolve slightly and, immediately upon disengagement of the portion 24 from the ear 30, prevents any possibility of accidentally treadling the machine while removing or installing a die, through the medium of pin 27.

The mechanism thus far described is designed to lock the several parts in the machine against operation and to lock a die which has been previously attached to the plunger, against removal. The die is mounted on the plunger by means of the dovetail strip 36 which slides into a corresponding dovetail groove 47 formed in the plunger. A lever 43 keyed to a stub shaft 44 extending into the plunger plate 15 and carrying an eccentrically mounted block or roller 45, serves by engagement with a cam or wedging block 46 as an effective means of holding the die unit rigidly in position. Movement of the lever 43 in one direction serves to force the block 46 into camming engagement with the dovetail 36 through the eccentric action of the roller 45 and movement in the opposite direction tends to release same.

Having thus described the invention, the operation thereof will be readily apparent.

In operating the machine, assuming that a die is positioned on the plunger, the treadle rod 19 (normally held in an upper position by any suitable and conventional spring means) is pulled downwardly causing the lever 20 to move outwardly or to the right, from the position shown in Fig. 1, and initiating actuation of a friction clutch indicated generally at 48, by means of connections keyed to the shaft 49 which carries the treadle rod 19 and the lever 20. The clutch 48 is effective to connect a constantly rotating pulley 50 to a chain of gearing which in turn is connected to a hollow sleeve 51 forming part of a telescopic arm which is completed by a rod 52 slidable in the member 51 and abutting a spring therein.

The member 52 is connected to the table T and as will be obvious, is effective to move the table outwardly and inwardly during such time as the clutch 48 connects the gearing to the source of power, preferably the clutch 48 is of the single revolution type such that the table will be given a single forward and return movement.

A second clutch indicated generally at 53, is arranged to connect a crank shaft 54 to the pulley 50, and this clutch is controlled by a release lever 55 actuatable by the mechanism controlled by the first mentioned clutch 48, such that the two clutches will be synchronized with the clutch 54 operating only after the table has completed its movement. The plunger 16 is suitably linked to the shank 54 and upon actuation by the pulley 50 will partake of a single reciprocation downwardly to ornament the work and return.

When the table is in its forward or outer position the operator positions the work thereon against the abutment gage G and over an opening in the plate P, whereupon as the die subsequently engages the work the edges of the die will pass through the work and plate and into the backing paper which is fed automatically over the top of the support 10 beneath the table T.

It will be evident that the marking plate 11 will have been properly inked by the mechanism I as the table reciprocates.

The foregoing mechanism is more fully described in my aforementioned copending application.

Referring to Figs 4 and 6 it will be noted that the pin 27 is out of engagement with the slot 21 of the lever 20 so that the machine can be operated. When the lever 20 moves to the right in Fig. 1, the pin 27 takes the dotted line position where it bears against the flat portion of the lever. Fig. 6 also illustrates this position of the pin. When the treadle is released the lever 20 moves to the left, but as the plunger comes up, the cam lever 22 strikes the roll 28 and prevents the pin 27 from moving into the slot 21.

If a die is to be removed and new one inserted, it is necessary to move the cam lever 22 to a position where it will not block entry of the pin into the slot. When the lever is pulled out and released from ear 30, it pivots around the stud portion 31, being moved by the lever 25 which rotates about its pivot stud 26 through the action of the spring 29 and the pin 27 engages in the slot 21 locking the machine, as shown in Fig. 5.

The outward movement of the cam lever 22 not only includes the release of the stud portion 24 from the ear 30 of the die block, but also effects the withdrawal of stud 31, as well as the V-shaped member 34 from engagement with the dovetail 36 at its V-shaped opening 35. The die can now be withdrawn if released through action of the lever 43.

A new die now may be positioned in the plunger by sliding its dovetail strip 36 into the groove 47. A pin 48 effective to limit inward movement of the strip, is mounted in the groove 47, this pin being so positioned as to locate the die block with the V-shaped opening 35 in alignment with the portion 34 of the member 33. When the new die has been moved into this position the lever 43 is released, it being understood that in removing a die and putting in a new die the lever has been operated so as to release the clamping mechanism shown in Fig. 3.

With the die in proper position it still is not possible to operate the machine, and it is now necessary for the operator to move the cam lever 22 so that its pin portion will slide into the ear 30 on the die block and the part 34 into the V-shaped opening 35. When in this position the cam 22 rides against the roll 28 and forces the lever 25 back, withdrawing the pin 27 from the opening 21 of lever 20 whereupon the machine may now be operated by bringing the clutch mechanism (not shown) into play.

Having thus described by invention, what I claim as new and desire to secure by Letters Patent of the United States is:—

1. An ornamenting machine comprising a work support, a die holder and a die, means to detachably mount said die on said holder, mechanism providing relative movement between said support and said holder to effect an ornamenting operation, and means cooperative with said mounting means to lock said mechanism during removal of the die from its holder.

2. An ornamenting machine comprising a work support, a die holder and a die, means to detachably mount said die on said holder, mechanism providing relative movement between said support and said holder to effect an ornamenting operation, and means, cooperative with said mounting means, to lock said die against detachment from said holder during normal operation of the machine and to lock said mechanism against operation when said die is released for detachment.

3. An ornamenting machine comprising a work support, a plunger movable toward and from said work support, and a die unit detachably mounted on said plunger, means to move said plunger toward said work support to effect an ornamenting operation, and means engageable with said unit to lock same against detachment during normal operation of the machine and to lock the plunger moving means against operation when said unit is released for detachment.

4. An ornamenting machine comprising a work support, a die holder and a die, means to detachably mount said die on said holder, means, including a starting lever, providing relative movement between said support and said holder to effect an ornamenting operation, and means to lock said die against detachment from said holder during normal operation of the machine and to lock said moving means against operation when said die is released for detachment, comprising a member engageable with said mounting means and a member engageable with said starting lever operatively connected to said first member whereby the one member will move to locking position as the other member moves to releasing position.

5. An ornamenting machine comprising a work support, a die holder and a die, means to detachably mount said die on said holder, means, including a starting lever, providing relative movement between said support and said holder to effect an ornamenting operation, and means to lock said die against detachment from said holder during normal operation of the machine and to lock said moving means against operation when said die is released for detachment, comprising a mechanism operatively located between said mounting means and starting lever and movable into engagement with said lever as it moves out of engagement with said mounting means.

6. An ornamenting machine comprising a frame, a work support, a member reciprocable in said frame, toward and from said work support, a die detachably mounted on said member, power means to reciprocate said member to effect an ornamenting operation, means on said member to lock said die against detachment from the member during normal operation of the machine, means on the frame to lock said power means against operation, and means to synchronize movements of both locking means, whereby one will move to locking position when the other moves to releasing position.

7. An ornamenting machine comprising a frame, a work support, a member reciprocable in said frame, toward and from said work support, a die detachably mounted on said member, power means to reciprocate said member to effect an ornamenting operation, means including a stud slidable in said member to engage and lock said die against detachment from the member during normal operation of the machine, means including a lever pivoted on the frame and movable into engagement with said power means, to lock same against operation, and cam means interposed between said plunger and lever, to synchronize movements thereof, whereby one will move to locking position when the other moves to releasing position.

8. An ornamenting machine comprising a work support, a die holder and mechanism for effecting relative movement between said work support and die holder, a die unit, means to mount said unit on said holder, means to lock said unit to said holder, comprising a plunger slidable on the holder into engagement with said mounting means, and means, synchronized with said locking means, to lock said mechanism against operation when said unit is released.

9. An ornamenting machine comprising a work support, a die holder and mechanism for effecting relative movement between said work support and die holder, a die unit, means to mount said unit on said holder, means to lock said unit to said holder, and means to lock said mechanism against operation when said unit is released comprising a lever movably mounted in the machine in synchronized relation with said first locking means, and engageable in one position with said mechanism.

10. An ornamenting machine comprising a work support, a die holder and mechanism for effecting relative movement between said work support and die holder, a die unit, means to mount said unit on said holder, means to lock said unit to said holder, comprising a plunger slidable on the holder into engagement with said mounting means, and means to lock said mechanism against operation when said unit is released comprising a lever movably mounted in the machine in synchronized relation to said plunger and engageable in one position with said mechanism.

11. An ornamenting machine comprising a work support, a die holder and mechanism for effecting relative movement between said work support and die holder, a die unit, means to mount said unit on said holder, means to lock said unit to said holder comprising a normally operable plunger slidable on said holder into engagement with said mounting means, and with said unit, and means, synchronized with said locking means, to lock said mechanism against operation, when said unit is released.

12. An ornamenting machine comprising a work support, a die holder and mechanism for effecting relative movement between said work support and die holder, a die unit detachably mounted on said die holder, means to lock said unit to said holder comprising a manually operable plunger slidable on said holder into engagement with said unit, and automatically operable means synchronized with said locking means, to lock said mechanism against operation when said unit is released.

13. An ornamenting machine comprising a work support, a die holder, and mechanism for effecting relative movement between said work support and die holder, a die unit, means to mount said unit on said holder, means to lock said unit to said holder comprising a plunger slidable on the holder into engagement with said mounting means, and means to lock said mechanism against operation when said unit is released, comprising a lever movably mounted in the machine and engageable in one position with said mechanism, and a cam rigid with said plunger and positioned for engagement with said lever when said plunger is in locking position, effective to hold said lever out of engagement with said mechanism.

14. An ornamenting machine comprising a frame, a work support, a die holder, and mechanism for effecting relative movement between said work support and die holder, a die unit, means to mount said unit on said holder, means to lock said unit to said holder, and means to lock said mechanism against operation when said unit is released, comprising a lever pivotally mounted on said frame and having a fork engageable with said mechanism for locking same and another fork operatively connected to said first locking means whereby movements of both locking means will be synchronized.

15. An ornamenting machine comprising a frame, a work support, a die holder and mechanism for effecting relative movement between said work support and die holder, a die unit, means to mount said unit on said holder, means to lock said unit to said holder comprising a plunger slidable on said holder into engagement with said mounting means, means to lock said mechanism against operation when said unit is released, comprising a lever pivotally mounted on said frame and having a fork engageable with said mechanism, and a cam interposed between said plunger and said lever, said lever having a second fork engageable with said cam when the plunger is in locking position, effective to hold said lever out of engagement with said mechanism.

16. In an ornamenting machine having a work support, a die holder and a detachable die, mechanism providing relative movement between said support and said holder to effect an ornamenting operation the combination with means to lock said die in normal operating position, and means automatically operable to lock said machine against operation when said die is released for detachment from the machine, and to unlock said machine when the die is attached in normal operating position.

17. In an ornamenting machine having a work support, a die holder and a removable die, mechanism providing relative movement between said support and said holder to effect an oramenting operation the combination with means to lock said die in normal operating position, and means automatically operable to lock said machine against operation when said die is released for movement out of normal operating position, and to unlock said machine when the die is attached in normal operating position.

18. An ornamenting machine comprising a work support, a die holder and a die unit, detachably carried by said holder, means to latch said die unit to said holder, means to move said die unit into ornamenting relation with a work piece on said support, means to initiate actuation of said moving means, and means to hold said initiating means in an inoperative position when said die unit is released for detachment, and means to release said holding means when said unit is latched.

19. For use in an ornamenting machine, a die unit comprising a base, a cutting die and a marking die, means mounting said dies on the base, a member on said base shaped to engage and fit a portion of the machine, thereby to hold the unit in the machine, said member having a locking portion engageable with a movable element of the machine and effective by such engagement to lock the unit in position in the machine, and means on said base effective to receive a machine locking element as such element moves to a machine releasing position.

20. For use in an ornamenting machine, a die unit comprising a base, a cutting die and a marking die, means mounting said dies on the base, a dove-tailed member located on the opposite side of the base from the dies and shaped to fit a complementary shaped portion of the machine thereby to hold the die base to the machine, said dove-tailed member having a V-shaped locking portion engageable with a movable complementary shaped element of the machine and effective by such engagement to lock the unit in position, and means on said base effective to receive a machine locking element as such element moves to a machine releasing position.

21. For use in an ornamenting machine, a die unit comprising a base, a cutting die and a marking die, means mounting said dies on the base, a dove-tailed member located on the opposite side of the base from the dies and shaped to fit a complementary shaped portion of the machine thereby to hold the die base to the machine, said dove-tailed member having a V-shaped locking portion engageable with a movable complementary shaped element of the machine, and effective by such engagement to lock the unit in position and an extending plate located near the edge of said base and having an opening to receive a machine locking element as such element moves to a machine releasing position.

22. For use in an ornamenting machine, a die unit comprising a base, a cutting die and a marking die, means mounting said dies on the base, a member on said base shaped to engage and fit a portion of the machine, thereby to hold the unit in the machine, said member having a locking portion engageable with a movable element of the machine and effective by such engagement to lock the unit in position in the machine, and means on said base effective to receive a machine locking element as such element moves to a machine releasing position, said last means being so located relative to said member as to prevent reception of the machine locking element by said means until the unit is accurately positioned in the machine.

23. For use in an ornamenting machine, a die unit comprising a base, a cutting die and a marking die, means mounting said dies on the base, a dove-tailed member located on the opposite side of the base from the dies and shaped to fit a complementary shaped portion of the machine thereby to hold the die base to the machine, said dove-tailed member having a V-shaped locking portion engageable with a movable complementary shaped element of the machine and effective by such engagement to lock the unit in position, and means on said base effective to receive a machine locking element as such element moves to a machine releasing position, said last means being so located relative to said V-shaped member as to prevent reception of the machine locking element by said means until the unit is accurately positioned in the machine.

24. For use in an ornamenting machine, a die unit comprising a base, a cutting die and a marking die, means mounting said dies on the base, a dove-tailed member located on the opposite side of the base from the dies and shaped to fit a complementary shaped portion of the machine thereby to hold the die base to the machine, said dove-tailed member having a V-shaped locking portion engageable with a movable complementary shaped element of the machine, and effective by such engagement to lock the unit in position and an extending plate located near the edge of said base and having an opening to receive a machine locking element as such element moves to a machine releasing position, said opening being so located relative to said V-shaped member as to prevent reception of the machine locking element by said opening until the unit is accurately positioned in the machine.

25. In a die for the purpose described the combination of a support, a cutting die, an ink marking die, means for mounting said dies on said support so that they are relatively movable as to each other, said marking die being normally in advance of the cutting die, and means for preventing the chips removed from the work by the cutting die from being discharged toward the marking die.

26. In a die for the purpose described the combination of a support, a cutting die having chip openings therethrough, an ink marking die, means for mounting said dies on said support so that they are relatively movable as to each other, said marking die being normally in advance of the cutting die, and means for preventing the chips removed from the work by the cutting die from being discharged toward the marking die, comprising a chamber about the chip openings of the cutting die at their ends away from the marking die for receiving chips from the cutting die.

27. In a die for the purpose described the combination of a support, a cutting die having chip openings therethrough, an ink marking die, means for mounting said dies on said support so that they are relatively movable as to each other, said marking die being normally in advance of the cutting die, and means for preventing the chips removed from the work by the cutting die from being discharged toward the marking die, comprising a chamber about the chip openings of the cutting die at their ends away from the marking die, for receiving chips from the cutting die, and means projecting laterally of the chamber for conducting away the chips.

28. A combination die for the purpose described comprising a plate, cutting edges mounted on said plate for cutting out designs in shoe upper materials, an ink marking die resiliently mounted on said plate in advance of the cutting edges, said plate having holes therein through which chips can pass when cut out by the said cutting edges, and a wall surrounding said holes and directing said chips laterally over the plate for the purpose described.

29. In a combination die for the purpose described a support, a cutting die, an ink marking die, means for mounting the cutting die on the support, means for resiliently mounting the marking die in advance of the cutting die and means for preventing chips removed from the work by the cutting die from being discharged toward the marking die.

30. In a combination die for the purpose described a combination support, a cutting die, an ink marking die, a plate forming part of the cutting die, means for mounting the marking die resiliently in advance of the cutting die, holes for passage of chips removed from the work extending through the cutting die and plate, and a wall about the plate preventing chips from being discharged except at the side of the plate for the purpose described.

31. A combined ink marking and cutting out machine comprising a cutting die, and an ink marking die mounted resiliently in advance of the cutting die, means for bringing said dies progressively into engagement with material to be marked and cut out, said marking die arranged to act as a stripper for the cutting die, means for inking the marking die, said cutting die having chip openings and a chamber surrounding the ends of said openings away from the marking die and arranged to direct the chips laterally so as to clear the inking means when discharged from the die, for the purpose described.

32. A combined ink marking and cutting out machine comprising a cutting die, and an ink marking die mounted resiliently in advance of the cutting die, means for bringing said dies progressively into engagement with material to be marked and cut out, means for inking the marking die, said cutting die having chip openings and a chamber surrounding the ends of said openings away from the marking die and arranged to direct the chips laterally so as to clear the inking means when discharged from the die, for the purpose described.

33. In an ornamenting machine, a combined ink marking and cutting die unit comprising a die support, a die block on said support, cutting edges extending from said support, a marking plate, resilient means mounting said marking plate on said block in advance of said cutting edges, and for movement toward and from said cutting edges, whereby the marking plate may be inked without inking the cutting edges of the die, and means to support said unit in the machine.

34. A machine for ornamenting shoe parts comprising a movable support, means to properly position a piece of work on said support, a head, means for holding a marking, and a perforating die in said head, means movable with said support to apply ink to said marking die, and means to bring said dies and work into operative engagement thereby to ornament the work.

BENJAMIN W. FREEMAN.